United States Patent

Gotshall

[15] 3,671,613
[45] June 20, 1972

[54] PELLETING OF OIL-COATED CARBON PARTICLES

[72] Inventor: William W. Gotshall, Orchard Lake, Mich.
[73] Assignee: Marathon Oil Company, Findlay, Ohio
[22] Filed: March 25, 1970
[21] Appl. No.: 22,647

[52] U.S. Cl. ............................................. 264/115, 264/117
[51] Int. Cl. .................................................. B01j 2/12
[58] Field of Search ............................. 264/117, 115

[56] References Cited

UNITED STATES PATENTS 3,326,642   6/1967   Ruble ............................. 264/117
3,077,439   2/1963   Shea, Jr. et al. ................ 264/117

OTHER PUBLICATIONS

Agglomeration, Chemical Engineering, Dec. 4, 1967 page 154, McGraw-Hill Publishing Co., N.Y.

Primary Examiner—Robert F. White
Assistant Examiner—J. R. Hall
Attorney—Joseph C. Herring, Richard C. Willson, Jr. and Jack L. Hummel

[57] ABSTRACT

Oil-coated pulverized carbon particles are pelleted by mixing with roughly 5 to 15 percent by weight methanol, then drying in a solvent recovery system to provide a pelletized product while leaving the oil-coatings intact.

8 Claims, 1 Drawing Figure

PATENTED JUN 20 1972
3,671,613
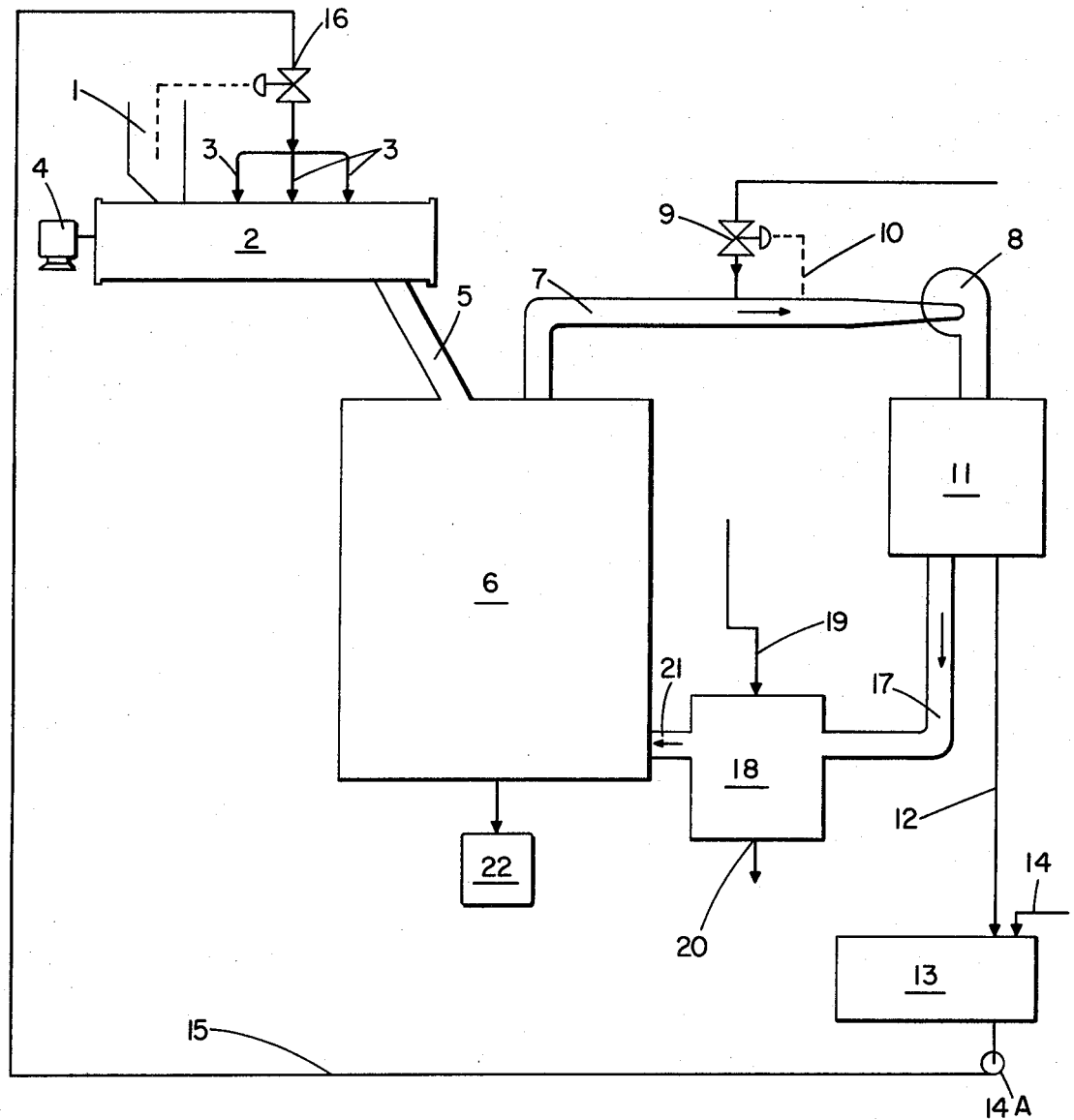
INVENTOR
W. W. GOTSHALL
BY
ATTORNEY

PELLETING OF OIL-COATED CARBON PARTICLES

CROSS REFERENCES TO RELATED APPLICATIONS

The following U.S. Patent applications relate to the general field of the present invention. Ser. No. 22,644 filed Mar. 25, 1970 which can utilize the pelleted products of the present invention, Ser. No. 22,646 filed Mar. 25, 1970 which also can utilize the pelleted products of the present invention, Ser. No. 22,648 filed Mar. 25, 1970 which provides feed materials suitable for use in the present invention, Ser. No. 476,504, now U.S. Pat. No. 3,493,532, and Ser. No. 22,645 filed Mar. 25, 1970, both of which latter cases also provide feed materials suitable for use in the present invention and Ser. No. 774,551, filed July 22, 1968 which can utilize the pelleted products of the present invention.

BACKGROUND OF THE INVENTION

The production of superior reinforcing agents by grinding cokes, chars, coals, and other carbon-aceous materials in a nonoxidizing atmosphere, particularly in a fluid energy mill and protecting them until they are compounded into elastomeric compositions, are disclosed in the aforementioned related U.S. patent applications and as follows: U.S. Pat. Nos. 3,404,019 and 3,404,120 and divisional applications thereof, all to the inventor of the present invention. Techniques for the production of vulcanizable elastomeric compositions containing carbon are taught in Reinforcement of Elastomers Gerard Kraus, ed., Interscience Publishers 1965 — Series Polymer Engineering and Technology, Introduction to Rubber Technology, Maurice Morton, ed., Reinhold Publishing Corp. (1959) New York and in the references cited therein.

The techniques of the above-mentioned U.S. patents require that carbonaceous material be ground in a nonoxidizing atmosphere and thereafter be protected from oxygenation of the surface until it is compounded into a vulcanizable elastomeric composition. Preferably, this protection is accomplished by coating the individual carbon particles with viscous liquids which provide barriers against oxygenation. Such liquids can be applied to the carbon particles by conventional blending, e.g., by spraying hot liquid into conventional solid-liquid blender or by the techniques of the aforementioned United States Pat. application Ser. No. 22,645 filed Mar. 25, 1970 by adding to the feed to the pulverizer or by other means. However, such oil coatings substantially prevent water from wetting the particles so that conventional techniques of aqueous wet pelleting cannot be used. Wetting with organic liquids which are immiscible with the barrier liquids coating the particles may cause displacement of the barriers with consequent evaporation of the displacing immiscible organic liquids and attendant loss of protection against oxygenation. Use of many of the organic liquids which are miscible with the liquid barriers coating the particles may cause undesirable modifications of the physical nature of the protective coating, e.g., by lessening adhesion or by lowering the viscosity of the coating, thus causing loss of protection. Unprotected particles are subject to deleterious oxygenation as discussed in the aforementioned U.S. Patents. In unpelletized form, the carbon materials have undesirable low bulk density and a tendency to dust.

SUMMARY

1. General Statement of the Invention

The present invention provides carbonaceous particles in a form ready for simple conventional wet pelleting and, after pelleting, restores the original organic liquid barrier against oxygenation so that it uniformly coats the particles. Further, the present invention provides protection against oxygenation during the pelleting process itself. According to the invention, carbon which has been pulverized under nonoxidizing atmosphere according to the techniques of the aforementioned U.S. Patents, is coated with an organic liquid as a protective barrier against oxygenation and the resulting coated particles are treated with methanol in quantities of from about 10 to about 100, more preferably 30 to 60, and most preferably 35 to 55 percent by weight methanol based on the weight of the carbon. The exact amount of methanol used is that necessary to impart optimum pelletizing properties during the conventional wet pelleting operation which follows. This wet pelleting may be accomplished in a variety of agglomeration devices, e.g., extrusion pelleters, briquetters, pill presses and Dravo wheels and especially in carbon black pelletizers of the general pin-mill variety discussed in U.S. Pat. No. 3,326,642. After the pelletizing is complete, the pellets are heated in a conventional solvent recovery system to a temperature of from about 100 to about 400, more preferably 160 to about 350 and most preferably 175° to 250° F. at a pressure which may range from sub-atmospheric to somewhat above atmospheric. Temperature and pressure are selected so that the methanol is effectively removed without disturbing the organic liquid barrier which reforms on the surface of the carbon particles, protecting them from oxidation during storage. The pelletized pulverized carbon is then compounded into any of a wide variety of conventional rubber formulations, preferably substituting on a weight volume-for-volume basis for all or a portion of the carbon black conventionally used in such formulations.

The specific gravity of methanol is 0.7914, thus the substituted methanol weighs only about 79 percent of the weight of the water conventionally used for pelletizing and this amount fills the same volume and completely wets the carbon particles. Since the boiling point of methanol is 149° F. as compared to 212° F. for water, the drying can be accomplished using exhaust steam rather than more expensive higher temperature heating sources, e.g., gas firing or high pressure steam, which would be required to provide an adequate temperature differential across the heat exchanger if the particles to be dried were wet with water rather than with the methanol of the invention. The latent heat of vaporization of methanol at atmospheric pressure is about 474 BTUs per pound as compared to 970 BTUs per pound for water (that is, about 49 percent of the latent heat of water). Combining the lower specific gravity and lower latent heat of methanol, the heat required to dry a methanol-wet pellet is only about 39 percent of that required to dry a pellet containing an equal weight of carbon but wet with an equal volume of water instead of methanol.

2. Utility of the Invention

The pelletized coated carbon particles prepared by the processes of the present invention are useful in the manufacture of a wide variety of elastomeric products, including mechanical rubber goods, tire carcasses and tread stocks, rubber extrusions, and similar materials made from vulcanizable elastomers such as natural and synthetic rubbers, e.g., styrene-butadiene (SBR) copolymer, butadiene-acrilonitrile copolymer, butyl rubber, ethylene-propylene-diolefin terpolymers, polyisoprene, vulcanizable polymeric elastomeric material containing double bonds and derived from chloroprenes or fluoroprenes.

BRIEF DESCRIPTION OF THE DRAWING

The drawing is a schematic representation of the apparatus utilized for the present invention.

DESCRIPTION OF THE PREFERRED EMBODIMENTS

1. Starting Materials a. Carbon materials

Carbonaceous materials suitable as starting materials for the present invention include delayed petroleum coke, fluid petroleum coke, anthracite coal, coke derived from coal, char, e.g., nonagglomerating materials derived from coal or by the techniques of copending application Ser. No. 22,648 filed Mar. 25, 1970. Preferably the carbonaceous materials should contain from about 0.1 to about 10, more preferably from 1 to about 8, and most preferably from 2 to about 6 percent by weight volatile combustible matter based on the weight of carbon.

b. Organic Barriers

The organic materials utilized as barriers against oxygenation of the surface of the pulverized carbon are preferably hydrocarbons, more preferably aromatic hydrocarbons, and most preferably light catalytic cycle oils derived according to the techniques of the aforementioned application Ser. No. 22,648, filed Mar. 25, 1970. Suitable barrier liquids include paraffinic oils, e.g., hydrogenated gas oils and mineral oils; olefinic oils, e.g. cracked gasoline stocks, catalytic slurry oils, fatty acid salts, catalytic cycle oils and aromatic oils. Other suitable barrier liquids include: heavy catalytic cycle oil (HCCO), clarified catalytic slurry oil, or aromatic extracts of either of the latter two oils. In general, barrier liquids should have a viscosity of about 10 to 75 Saybolt Seconds Universal (SSU) at 100° F., more preferably a viscosity of about 20 to about 50 seconds, and most preferably a viscosity of 30 to 45 seconds. The liquid will preferably boil within the approximate range of 200 to 900, more preferably 250 to 800, and most preferably 325° to 600° F. Stearic acid or zinc stearic may be employed in lieu of the liquids, but these are relatively expensive as compared to the organic liquids. Mixtures of the above barriers may be employed.

c. Vulcanizable Elastomers

Vulcanizable elastomers in general may be employed, but preferred among these will be those mentioned above under "Utility," and most preferred are natural rubber and styrene-butadiene copolymer (SBR).

2. Apparatus a. The preferred grinding mills for pulverizing the carbonaceous material are fluid energy mills of the type commonly referred to as "hurricane mills," e.g., the Model No. 30-10 mill manufactured by Majac, Inc. of Sharpsburg, Pa. The fluid energy mills can operate on a wide variety of inert, nonoxidizing atmospheres. By "nonoxidizing atmosphere" is meant herein, media which do not contain substantial quantities of free oxygen. Steam is the most preferred grinding media from the standpoint of economy, but nitrogen, helium, hydrogen, argon, carbon dioxide, carbon monoxide, and a wide variety of other gases commonly thought of as inert or reducing, may be utilized. For maximum economy in grinding, gases of lower molecular weights, e.g., hydrogen and steam, are preferred.

The autogenous grinding mill is conventionally operated, preferably at temperatures of from about 350° F. to about 800° F., more preferably from about 400° F. to about 700° F., and most preferably at 400°–500° F. The classifier is operated to provide an average particle size (by weight) of less than about 2.5 microns with 99 percent by weight of the product having particle size of less than 5 microns. More preferred ranges are average Particle size of less than 1.5 and 99 percent by weight less than 3 microns.

The classifier is preferably a centrifugal type and is operated under nonoxidizing atmosphere.

b. The pelletizer can be of the type discussed in U.S. Pat. No. 3,326,642, or an extruder, a pill press, a Dravo wheel, briquettor or other conventional device for shaping wetted moldable and extrudable compositions, operated conventionally. Suitable devices are described in Section 8, pages 59–64 of Perry's Chemical Engineer's Handbook, 4th ed. 1963.

3. The grinding process

The autogenous grinding mill is conventionally operated, preferably at temperatures of from about 350° F. to about 800° F., more preferably from about 400° F. to about 700° F., and most preferably at 400°–500° F. The classifier is operated to provide an average particle size (by weight) of less than about 2.5 microns with 99 percent by weight of the product having particle size of less than 5 microns. More preferred ranges are average particle size of less than 1.5 and 99 percent by weight less than 3 microns.

4. Coating the particles

The particles are coated with from 1 to 8, more preferably 2 to 6, and most preferably 3 to 5 percent by weight (based on the weight of the particles) of the organic barrier liquid. The coating step can be accomplished by feeding the organic liquid and the particles into a dry blender, e.g., a ribbon blender such as those manufactured by J.H. Day Company and intimately admixing the two ingredients so as to coat substantially all of the individual particles with the barrier liquid. The techniques of copending application, Ser. No. 22,645 filed Mar. 25, 1970 can be utilized to coat the particles, either in a blender or by spraying the organic barrier, mixed with the methanol directly into the pelleter and blanketing with inert gases until the particles are coated. The coating process and any storage between the grinding and the coating processes are accomplished under a nonoxidizing atmosphere, e.g. nitrogen.

5. Examples

The invention will be more fully understood by reference to the following examples which are to be considered as merely illustrative thereof.

Example I

A raw fluid coke produced by granulating a fluid petroleum coke of the type produced according to the methods of A. Voorhies, Fluid Coking, Proceedings of the 4th World Petroleum Congress, Section III/F, page 316 and Petroleum Processing, March, 1956, pages 135 to 137 is fed to a Model No. 30-10 mill manufactured by Majac, Inc. of Sharpsburg, Pa. The grinding is accomplished according to the technique of the aforementioned U.S. Pat. No. 3,404,019. Steam is utilized as the grinding fluid and a sonic velocity at approximately 400° to 800° F. (after exiting from the nozzle) and 100 to 150 p.s.i.g. nozzle pressure is maintained in the grinding section of the mill. This particular mill has opposed nozzles which cause the stream of particles to impinge upon a second stream of particles causing highly efficient autogenous grinding. This grinding process is continued with particles having an average particle size of below about 1.5 microns and 99 percent by weight having a particle size below about 3 microns being continuously withdrawn from the classifier of the Majac mill. Oversized particles are returned to the pulverizer for further grinding. Care is taken to exclude oxygen, and the water from which the steam is prepared is deaerated prior to entering the steam boilers. While in the classifier, the product is sprayed with approximately 0.1 to 1 percent based on the weight of the product of an aromatic oil having a viscosity of approximately 35 seconds SSU at 100° F. and consisting of a 50 percent by weight mixture of heavy catalytic cracking oil (comprising primarily alkyl naphthalenes) (HCCO) and xylenes. This product is stored in bins until it is ready for processing as described below.

Referring to the drawing, the relatively fluffy coated particles are fed to bin 1 of pelletizer 2 which is a plastic-lined carbon black pin mill as described in U.S. Pat. No. 3,326,642. This pelletizer is operated conventionally except that approximately (0.4) pounds of methanol is introduced through the liquid binder inlets 3 for each pound of carbon entering the pelletizer 2. A motor 4 turns a horizontal shaft (not shown) at approximately 500 rpm within the pelletizer and rod-like extensions (not shown) mounted perpendicular to the central shaft in a spiral pattern impacts the carbon particles which are wet with HCCO-xylene and the methanol which is continuously sprayed into the pelletizer via inlets 3. This action gradually forms spherical pellets of approximately one-sixteenth inch in diameter and which move longitudinally through the pelletizer until they fall into the outlet conduit 5 which conducts them to the interior of a conventional solvent-recovery type dryer, in this case a Wyssmont dryer 6. The temperature in the dryer is maintained at from about 200 to about 250 and the pressure is approximately atmospheric. Methanol evaporates from the pellets and the gas stream is removed from the dryer through conduit 7 under the action of blower 8. The protective barrier liquid, having a much higher boiling point than the methanol, remains substantially in place and reforms a protective coating over the entire surface of each of the carbon particles. The entire drying apparatus is blanketed with an inert gas, e.g. $N_2$, $CO_2$ or CO. An automatic valve 9 controls the input of additional inert gas as required by the action of pressure control 10 which is set to maintain approximately atmospheric pressure. A conventional water-cooled condenser 11 condenses the methanol from the stream of inert gases from the dryer and the methanol is recovered through line 12 into methanol storage tank 13. Make-up methanol is added as required through make-up line 14. Methanol is moved by a small positive displacement pump 14a through recycle line 15 into liquid binder inlets 3 which comprise sprayheads (not shown) located within the pelletizer to distribute the methanol uniformly over the carbon in the pelletizer. The flow of methanol to the pelletizer is controlled by an automatic valve-ratio controller 16 which is set to maintain the aforementioned weight ratio of methanol fed per pound of carbon fed.

The inert gases from which the methanol has been condensed exit from condenser 11 through conduit 17 into a conventional heater 18 heated by exhaust steam available from another process and entering through steam inlet 19 with condensate being removed through condensate outlet 20. The heated inert gases move through conduit 21 and sweep through the dryer 6, picking up additional quantities of methanol and recirculating as described above. Finished dried pellets are removed from the dryer 6 to bagging operation 22. Alternatively, the pellets may be packaged in bulk transport bins or in bulk railway cars.

6. Modifications of the Invention

It should be understood that the invention is capable of a variety of modifications and variations which will be made apparent to those skilled in the art by a reading of the specification and which are to be included within the spirit of the claims appended hereto. For example, various other extruders, pelletizers, pill-makers or other convenient forming equipment may be utilized to shape the pulverized carbon, wet with the organic protective liquid barrier and the methanol, into the desired shapes and various other types of dryers may be employed to dry the shaped pellets which can be of any convenient shape, e.g., pills, longer cylinders, chopped extrusions of various geometric crossections, or spheres.

What is claimed is:

1. A method of forming pellets of carbon particles comminuted in a non-oxidizing atmosphere and having a coating of organic barrier material miscible with methanol to prevent oxygenation of said particles, comprising, in combination;
   a. forming a mixture by mixing said coated carbon particles with methanol,
   b. maintaining said mixture substantially free of water and under an atmosphere of non-oxidizing gases, while forming said mixture and agglomerating said mixture to form pellets within a pellet forming means, and drying said formed pellets under an atmosphere of non-oxidizing gas at an elevated temperature to evaporate said methanol, leaving a coating of said organic barrier remaining upon said particles as a barrier for preventing oxygenation of said carbon.

2. The process of claim 1 wherein the carbon particles comprise pulverized coke particles.

3. The process of claim 1 wherein from about 10 to about 100 percent by weight of methanol based on the weight of the carbon particles is added to the carbon particles.

4. The process of claim 1 wherein the pellet-forming means is a pin mill having a cylindrical shell coaxial with a central shaft, said central shaft having extensions which impact the carbon particles to form pellets.

5. The process of claim 1 wherein the pellet-forming means is a briquetter.

6. The process of claim 1 wherein the pellet-forming means is a pin-mill pelletizer.

7. The process of claim 1 wherein from about 30 to about 60 percent by weight methanol based on the weight of the carbon is used to wet the carbon, and wherein the methanol is evaporated by heating to from about 100° F. to about 400° F. at atmospheric pressure and wherein the organic barrier material is a hydrocarbon oil boiling in the range of about 250° F. to about 800° F. and having a viscosity of about 10 to about 75 Saybolt Seconds Universal at 100° F.

8. The process of claim 7 wherein the carbon particles are petroleum coke particles which have previously been ground in an atmosphere of superheated steam.

* * * * *